(12) United States Patent
Bosco, Jr.

(10) Patent No.: US 7,568,561 B2
(45) Date of Patent: Aug. 4, 2009

(54) METHOD OF SECURING A SHIM TO A BACKING PLATE AND SUBASSEMBLY FORMED THEREBY

(75) Inventor: Robert Bosco, Jr., Wolcott, CT (US)

(73) Assignee: Anstro Manufacturing, Inc., Wolcott, CT (US)

( * ) Notice: Subject to any disclaimer, the term of this patent is extended or adjusted under 35 U.S.C. 154(b) by 38 days.

(21) Appl. No.: 11/407,118

(22) Filed: Apr. 19, 2006

(65) Prior Publication Data
US 2007/0246315 A1    Oct. 25, 2007

(51) Int. Cl.
*F16D 69/00*    (2006.01)
*F16D 65/38*    (2006.01)

(52) U.S. Cl. .............. 188/250 B; 188/250 E; 188/250 G; 188/73.37; 188/72.1

(58) Field of Classification Search ............. 188/73.37, 188/250 E, 250 B, 250 G, 72.1
See application file for complete search history.

(56) References Cited

U.S. PATENT DOCUMENTS

| | | | |
|---|---|---|---|
| 4,846,312 A | 7/1989 | Sweetmore et al. | |
| 5,413,194 A * | 5/1995 | Kulis et al. | 188/251 A |
| 5,515,950 A * | 5/1996 | Kwolek | 188/73.36 |
| 5,538,104 A | 7/1996 | Katz et al. | |
| 5,816,370 A | 10/1998 | Verbeeten et al. | |
| 5,842,546 A * | 12/1998 | Biswas | 188/73.37 |
| 2005/0067235 A1* | 3/2005 | Pham et al. | 188/250 B |
| 2005/0082124 A1 | 4/2005 | Kulis, Jr. et al. | |

FOREIGN PATENT DOCUMENTS

| | | | |
|---|---|---|---|
| DE | 4104812 A | * | 8/1992 |
| JP | 08-240234 | * | 9/1996 |
| JP | 240234 | * | 9/1996 |

\* cited by examiner

*Primary Examiner*—Robert A Siconolfi
*Assistant Examiner*—Mahbubur Rashid
(74) *Attorney, Agent, or Firm*—Carmody & Torrance LLP

(57) ABSTRACT

A subassembly for use in a brake assembly, the subassembly comprising a shim, a backing plate and a friction pad formed of a friction pad material, wherein the friction pad material extends into at least one pass-through hole in the backing plate; and wherein one or more flanges perimetering at least one opening in the shim are encased in the friction material; whereby the shim is resisted from movement at least in part by the one or more flanges being encased in the friction pad material. A preferred methodology of forming the braking subassembly comprises the steps of forming the friction pad on the backing plate and at least partially filling the at least one pass-through hole with said friction pad material such that the one or more flanges perimetering the at least one opening in the shim is encased in the friction pad material.

1 Claim, 6 Drawing Sheets

METHOD OF SECURING A SHIM TO A BACKING PLATE AND SUBASSEMBLY FORMED THEREBY

BACKGROUND OF THE INVENTION

This invention relates generally to coupling attachments for securing shims to backing plates, and in particular, to an improved coupling method for ensuring improved coupling of the shim to the backing plate, and an improved assembly formed thereby.

Attachment arrangements for securing a shim to a backing plate are known, examples of which include the use of pins (e.g. U.S. Pat. No. 6,349,803), staples (e.g. U.S. Pat. No. 6,578,680) and integrally formed posts formed from the backing plate itself. Tabs that engage the edge of the backing plate are also known (e.g. U.S. Pat. No. 5,816,370).

However, in certain subassembly configurations, the present inventors have discovered that still further developments in the art are desirable. For example, the present inventors have discovered that it would be quite advantageous to utilize the material that makes up the friction pad to assist in securing the shim to the backing plate.

The idea of using the material that comprises the friction pad to aid in securing a shim to the backing plate is believed to one such idea that will improve the state of the art and is believed to be patentable over the known methodologies. For example, although U.S. Pat. No. 4,846,312 describes a flange of the shim and the material of the friction pad extending to the holes of the backing plate from the opposite side, the '312 patent stops short of describing or suggesting the idea of submersing the flange into the material itself. Likewise, U.S. Pat. No. 5,538,104 merely describes, as best understood by the present inventors, the formation of recesses in the friction pad material to receive the projections of the shim. As described in the '104 patent, the edges of the projections are merely proximate to the material of the friction pad. In a similarly distinct way, U.S. Published Patent Application No. 2005/0082124 merely describes and illustrates a one unitary molded friction pad and shim structure formed of the friction pad material.

It can thus be seen that the prior art lacks any description or suggestion of encasing the projections of the shim in the friction pad material to aid in securing the shim to the backing plate. In particular, the prior art of which the inventors are aware is completely devoid of any such description or suggestion of such a construction whereby the shim and the friction pad are separately formed prior to molding and made of different materials and coupled together in the manner to be disclosed below.

The present inventors have discovered that improved shim attachments are therefore achievable and provided by the present invention and believe that the present invention overcomes the perceived deficiencies in the prior art as well as provides the objectives and advantages set forth above and below.

OBJECTS AND SUMMARY AND OBJECTIVES OF THE INVENTION

Therefore, it is an object and advantage of the present invention to provide an improved mechanical coupling arrangement for securing a shim to a backing plate in a brake assembly.

It is a further object and advantage of the present invention to provide an improved methodology of coupling a shim to a backing plate in a brake assembly.

In particular, it is a specific object and advantage of the present invention to provide an improved methodology (and resulting assembly) of attaching a (e.g. multilayered) shim to a backing plate in a brake assembly that decreases the likelihood of decoupling of the shim from the backing plate as well as decreases the likelihood of separation of the shim's multilayers themselves.

It is thus another specific object of the present invention to provide an improved methodology (and resulting assembly) of coupling a (e.g. multilayered) shim to a backing plate in a brake assembly that provides superior noise-reduction and a decrease in the likelihood of decoupling of the shim from the backing plate as well as a decrease in a likelihood of separation of the shim's multilayers themselves.

Further objects and advantages of this invention will become more apparent from a consideration of the drawings and ensuing description.

The invention accordingly comprises the features of construction, combination of elements, arrangement of parts and sequence of steps that will be exemplified in the disclosure hereinafter set forth, and the scope of the invention will be indicated in the claims.

To overcome the perceived deficiencies in the prior art and to achieve the objects and advantages above and below, the present invention is, generally speaking, directed to a subassembly for use in a brake assembly, the subassembly comprising a shim comprising at least one opening having one or more flanges perimetering therearound; a backing plate comprising a first side surface and a second side surface, with at least a first pass-through hole from the first side surface to the second side first surface, wherein the one or more flanges perimetering the at least one opening in the shim is alignable with and receivable in the at least first pass-through hole when the shim is coupled against the second side surface of the backing plate; and a friction pad, formed of a friction pad material, coupled to the first side surface of the backing plate, wherein the friction pad material extends into the at least one pass-through hole; and wherein the one or more flanges perimetering the at least one opening in the shim are encased in the friction material; whereby the shim is resisted from movement at least in part by the one or more flanges being encased in the friction pad material.

In a preferred methodology of forming the braking subassembly for use in a brake assembly, the steps preferably comprise placing the shim against the second side surface of the backing plate and aligning the opening in the shim with the at least first pass-through hole such that the one or more flanges extend into the at least first pass-through hole; and thereafter forming the friction pad on the backing plate and at least partially filling the at least one pass-through hole with said friction pad material such that the one or more flanges perimetering the at least one opening in the shim is encased in the friction pad material; whereby the shim is resisted from movement at least in part by the flange being encased in the friction pad material.

BRIEF DESCRIPTION OF THE DRAWINGS

The above set forth and other features of the invention are made more apparent in the ensuing Description of the Preferred Embodiments when read in conjunction with the attached Drawings, wherein.

Like numbers to identify like parts and features will be used among the various figures, but not all features will be specifically identified in each illustration.

DETAILED DESCRIPTION OF THE PREFERRED EMBODIMENTS

Figure 1:
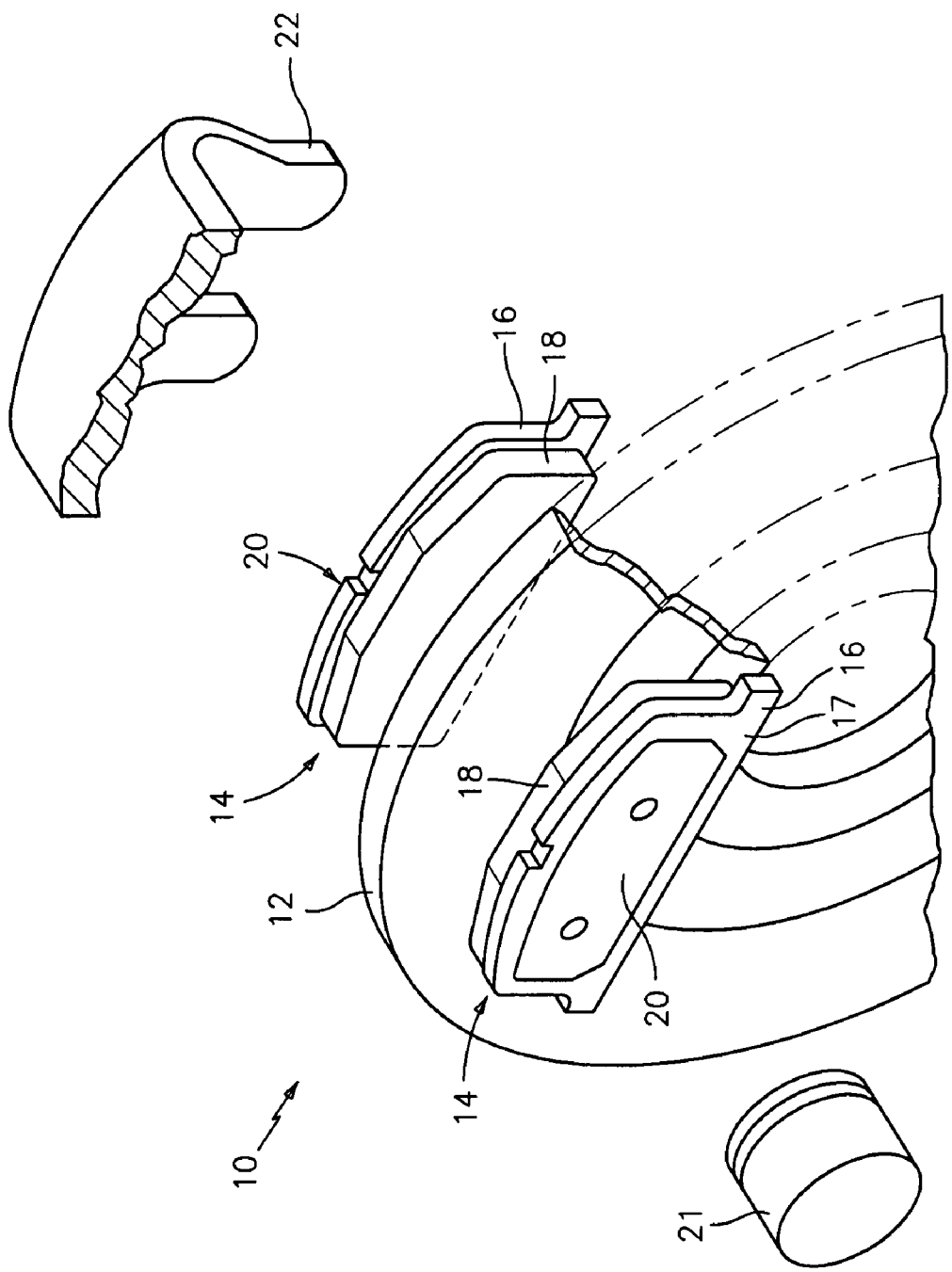
FIG. 1 is an exploded view of a portion of brake assembly, such as a disc-brake assembly, generally illustrating the present braking subassembly of the present invention.

Reference is first made to FIG. 1 for a general description of a disc-brake assembly generally indicated at 10, although most of assembly 10 (other than the features of the present invention which will be disclosed below) is well known to those skilled in the art. That is, it is well-known that disc brake assembly 10 is used to stop a rotatable disc 12 which rotates with the axle of a wheel to be braked. Assembly 10 can be seen to include opposing braking subassemblies generally indicated at 14, each of which comprise a steel backing plate, generally indicated at 16, and a brake pad 18 mounted on the side of backing plate 16 facing disc 12. The two backing plates 16 may be suspended in a conventional caliper mounting structure by rods (not shown) which extend through backing plates 16, thus permitting backing plates 16 to move axially on the support rods. As would also be well understood, backing plates 16 are moved inwardly toward one another under the force applied by, for example, a hydraulically actuated piston 21 and a related caliper 22. In such a configuration, when piston 21 and caliper 22 press backing plates 16 inwardly, the inner surfaces of braking pads 18 are engaged in frictional, braking contact with disc 12.

The shims, referenced herein by numeral 20, are mounted on a back surface 17 of each respective backing plate 16 to reduce the brake squeal noise during such a braking or frictional engagement, with one shim 20 preferably positioned between piston 21 and the piston facing (back) surface 17 of backing plate 16 while the other shim 20 is positioned between caliper 22 and the back surface 17 of its associated backing plate 16.

The present invention significantly reduces the likelihood that either shim 20 will become sheared or detached from its respective backing plate 16 during such a braking or frictional engagement.

Reference will also be made to the illustrations for a detailed description of the preferred method of securing shim 20 against first side surface 17 of backing plate 16 and the construction, features and advantages of the improved subassembly comprising the backing plate and noise dampening member (i.e. shim) formed thereby, but first, reference will be made to FIGS. 2-6 for a disclosure of subassembly 14 for use in a brake assembly of the type illustrated by way of example in FIG. 1.

In accordance with the present invention, subassembly 14 comprises (preferably multilayered) shim 20 comprising at least one (but preferably two) opening(s) 22, 23 having respective flanges 24, 25 perimetering therearound. As would be understood by those skilled in the art, flanges 24 and 25 may be sectioned (i.e. gaps between sections may be provided) so as to permit accurate bending or formation thereof.

Backing plate 16 is preferably formed of well known materials and in a conventional way, which itself comprises a first side surface and a second side surface, with at least one (but preferably two) pass-through hole(s) 52, 53 from the first side surface to the second side first surface.

Figure 2:
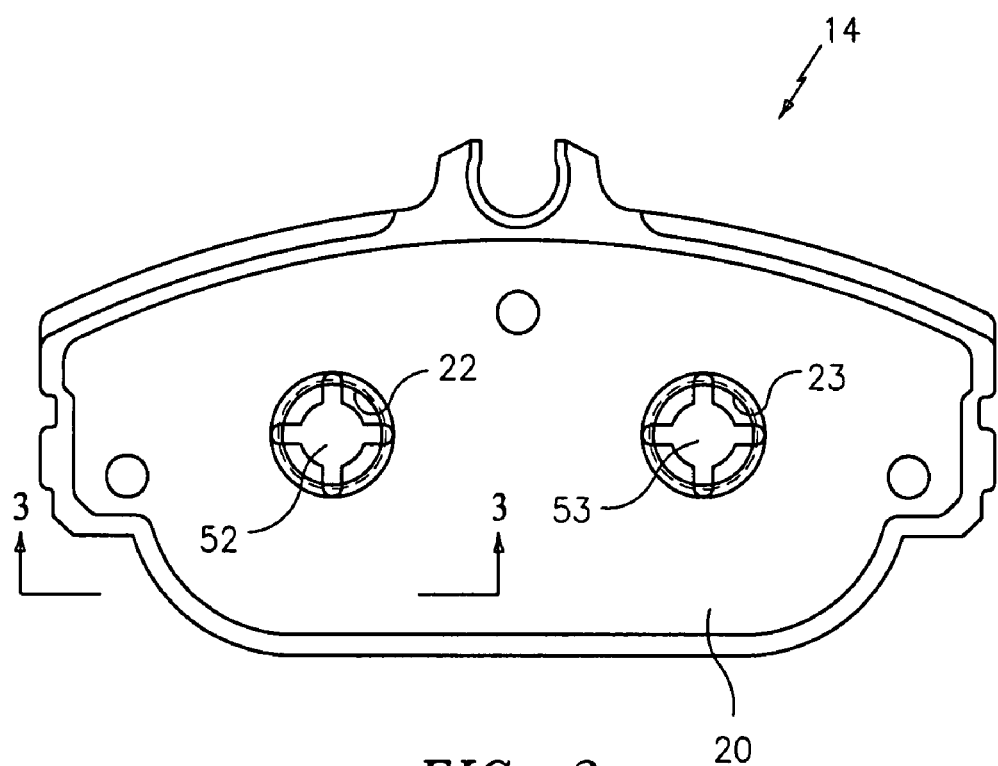
FIG. 2 is a plan view of a subassembly construction in accordance with the present invention.
Figure 3:
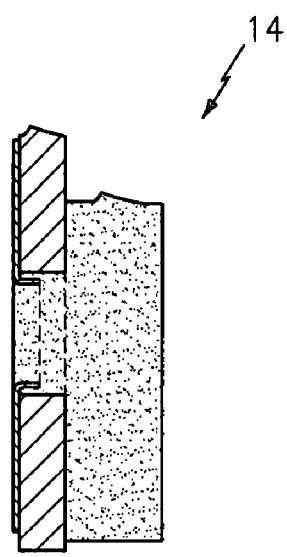
FIG. 3 is a cross-sectional view of the subassembly of FIG. 2 taken about lines 3-3 of FIG. 2, although it should be understood that FIG. 3 represents the same cross-section about the other respective holes in the shim and backing plate.
Figure 4:
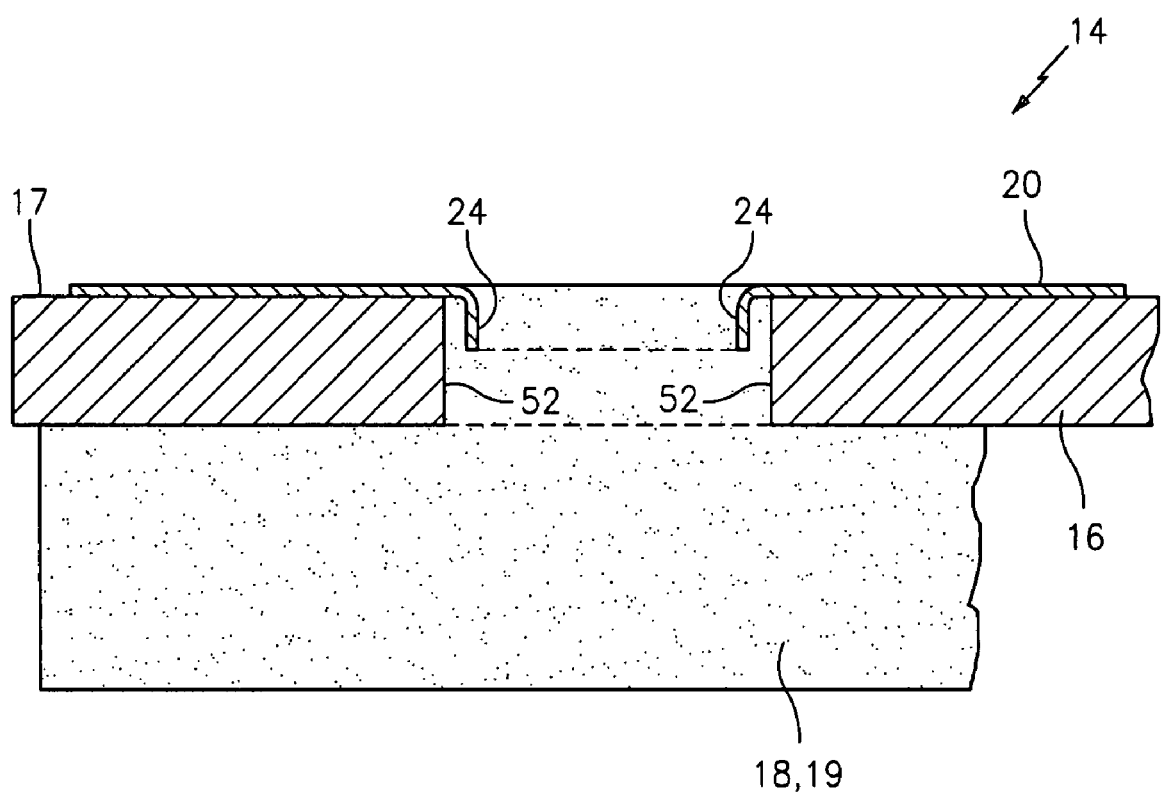
FIG. 4 is an enlarged view of FIG. 3.
Figure 5:
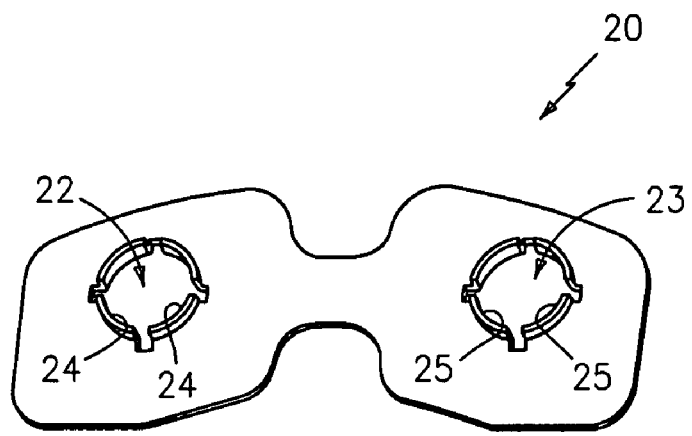
FIG. 5 is a perspective view of a shim constructed in accordance with the present invention.
Figure 6:
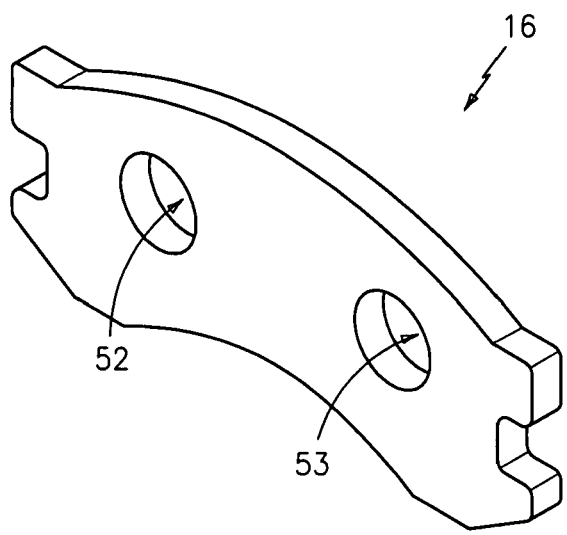
FIG. 6 is a perspective view of a backing plate constructed in accordance with the present invention.

As illustrated in FIGS. 2-4, flanges 24, 25, which perimeter respective openings 22, 23 in shim 20, are alignable with and receivable in the associated pass-through holes 52 and 53 when shim 20 is placed against second side surface 17 of backing plate 16.

Friction pad 18, formed of conventional friction pad material 19, is coupled to the first side surface of backing plate 16. As illustrated in FIGS. 3 and 4, friction pad material 19 extends into the pass-through holes 52, 53 and encases respective flanges 24, 25 of shim 20. In this way and separate and apart from any adhesive layer that may be provided as part of the shim construction (or other movement restrictive features that may be provided (e.g. tabs, etc.)), the encasing of flanges 24, 25 in friction material 19 restricts shim 20 from movement on and/or away from backing plate 16.

A method of forming a braking subassembly 14 is also provided, and FIGS. 7-11 are specifically directed thereto. Generally speaking, the method comprises the steps of (i) placing shim 20 against the second side surface of backing plate 16 and aligning openings 22, 23 in shim 20 with the respective pass-through holes 52, 53 such that the respective flanges 24, 25 extend into the respective pass-through holes 52, 53; and thereafter (ii) forming friction pad 18 on backing plate 16 and at least partially filling the pass-through holes 52, 53 with friction pad material 19 such that the flanges 24, 25 of shim 20 are encased in friction pad material 19; whereby shim 20 is resisted from movement on and/or away from backing plate 16 at least in part by flange 24, 25 being encased in friction pad material 19. Further details of the preferred methodology shall now be provided.

Figure 7:
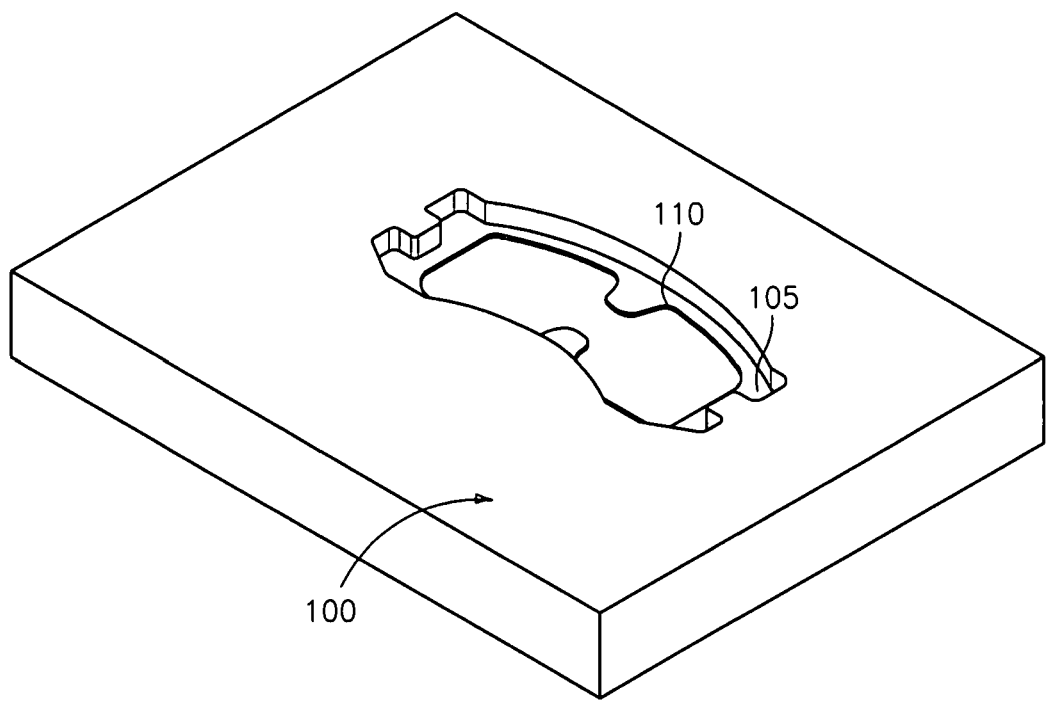
FIG. 7 illustrates a mold for use in connection with the formation of the subassembly of the present invention.
Figure 8:
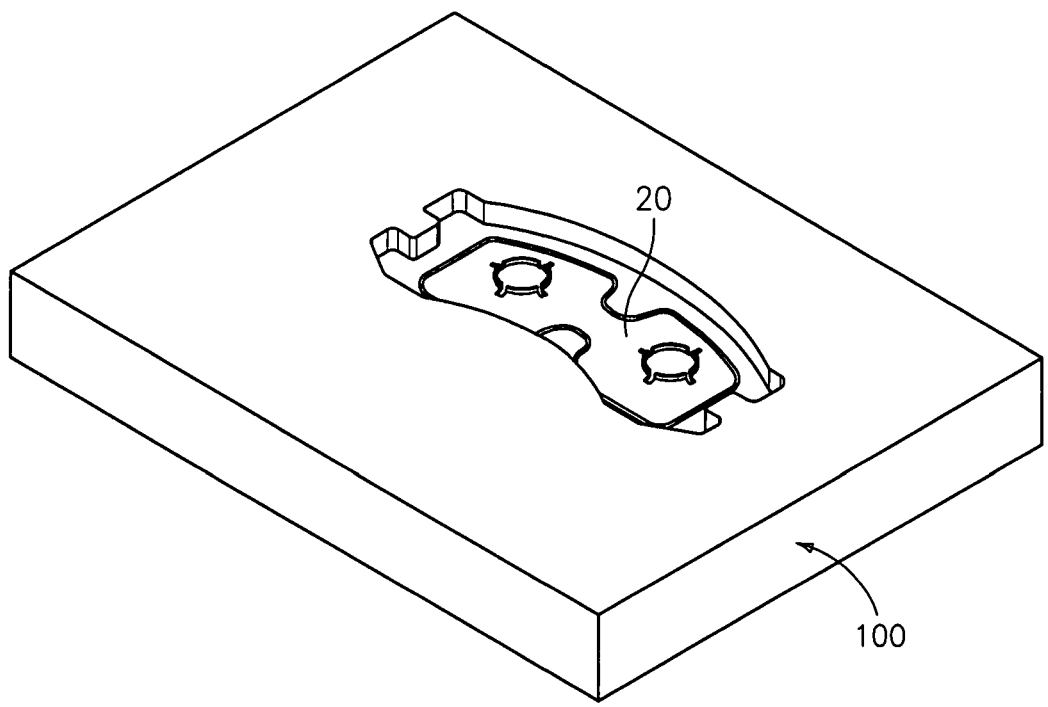
FIG. 8 illustrates the mold of FIG. 7 with a shim positioned therein.

Specifically, FIG. 7 illustrates a mold, generally indicated at 100, for use in connection with the formation of subassembly 14. Mold 100 has a cavity 105 generally in the shape of backing plate 16 and a further recess 110 is provided in cavity 105 for receiving shim 20. FIG. 8 illustrates mold 100 with an exemplary shim 20 positioned therein. It should be understood that shim 20 is not formed in mold 100, but rather is formed by a completely different (but well known) process away from mold 100. That is, a conventional and acceptable shim is preferably of a multi-layered construction, comprising layers of aluminum, metal alloys, laminates and/or layers of metals and adhesive and other materials, such as plastic if desirable, with the adhesive being of materials well known in the art of which acrylic and thermal setting adhesives are suitable, or a combination of both.

To be sure however, a single layered shim, having some form of flanges or the equivalent as disclosed herein, is also contemplated and covered herein. Shim 20 may be positioned in mold 100 simply by hand or by suitable automated step.

Figure 9:
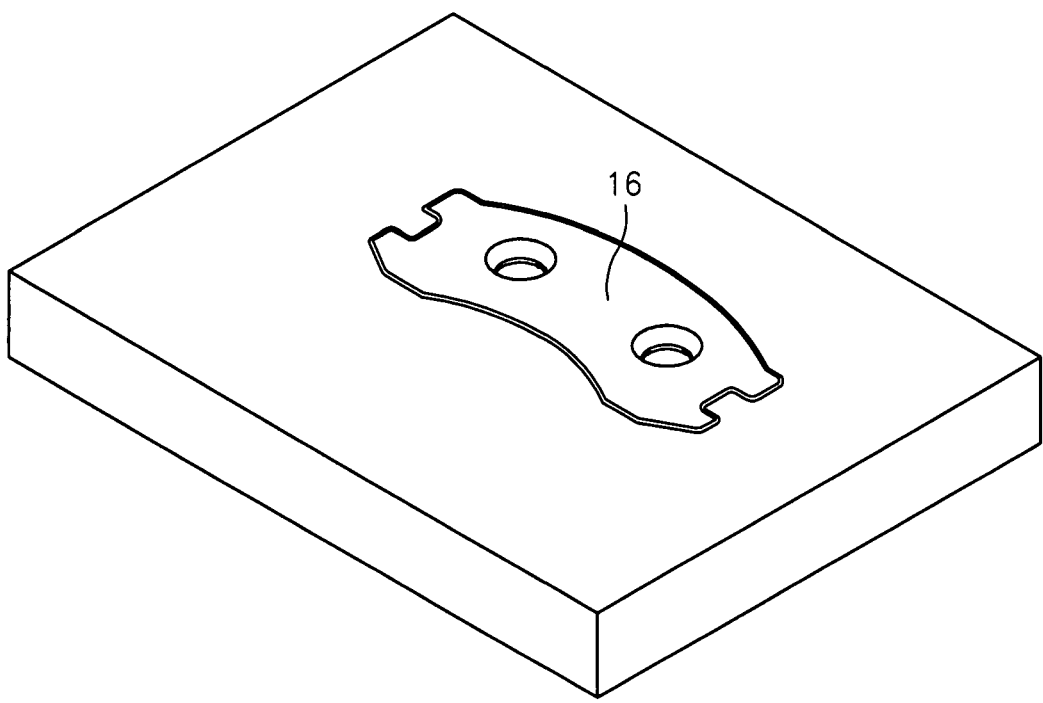
FIG. 9 illustrates the mold of FIG. 7 with the shim and backing plate placed therein.

As shown in FIG. 9, backing plate 16 may thereafter be positioned thereon, again by hand or a suitable automated step. As can be seen in this FIG. 9, openings 22, 23 in shim 20 are aligned with the respective pass-through holes 52, 53 such that the respective flanges 24, 25 extend into the respective pass-through holes 52, 53.

Figure 10:
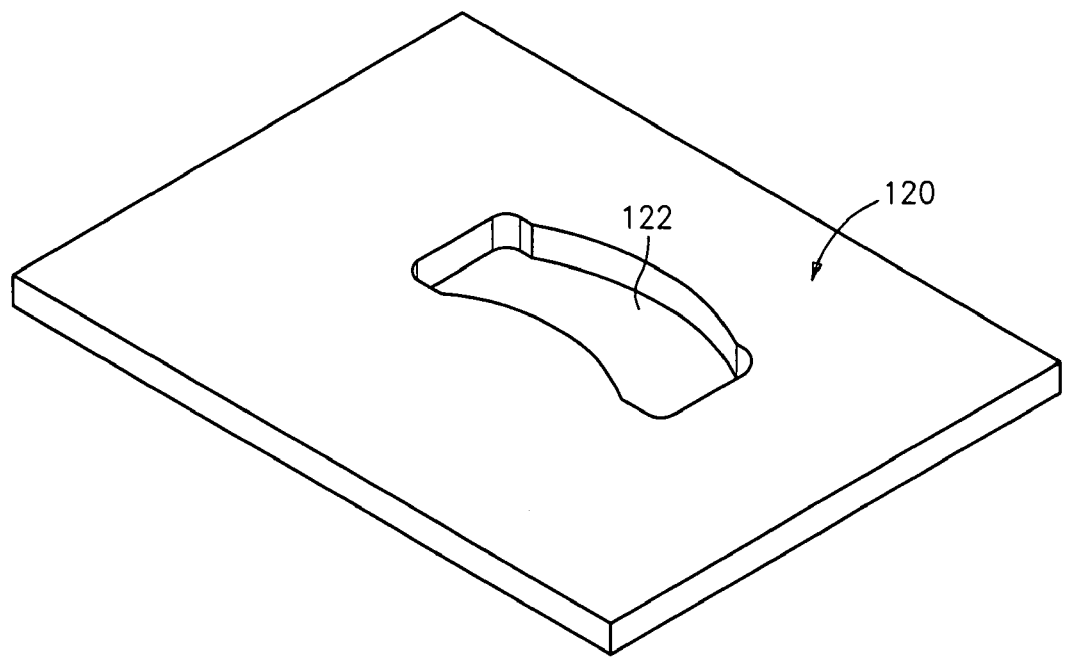
FIG. 10 illustrates a second mold used to assist in the formation of the friction pad.
Figure 11:
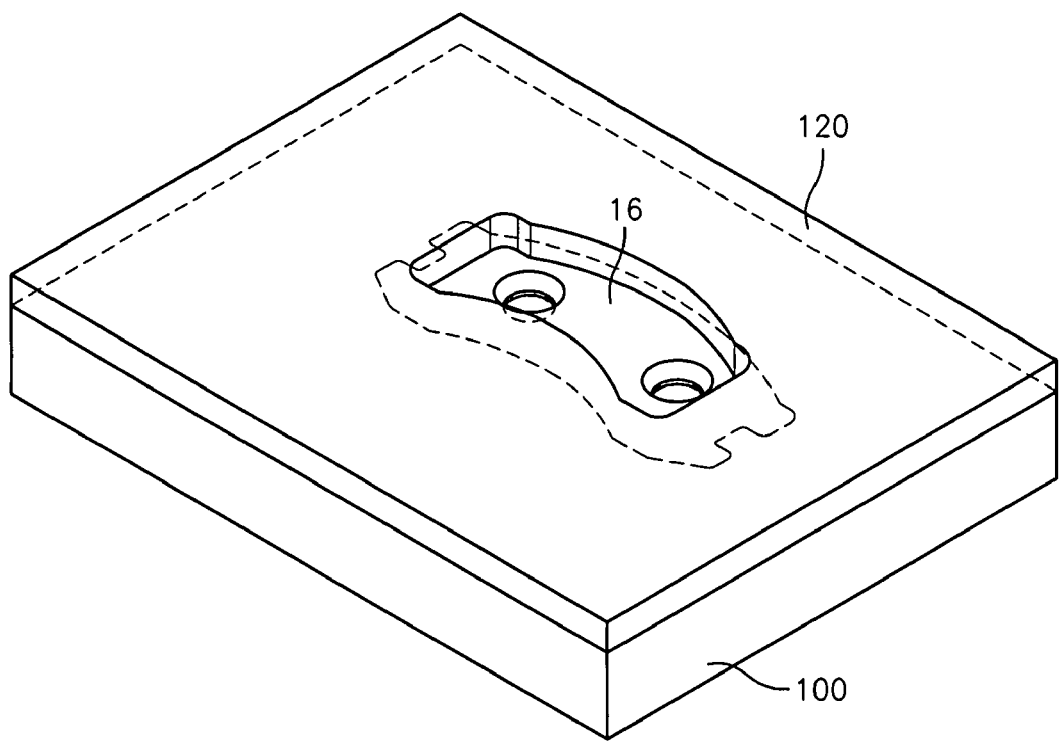
FIG. 11 illustrates the mold of FIG. 10 having been placed on the mold of FIG. 7 and prior to the formation of the friction pad in accordance with the methodology of the present invention.

Thereafter, a second mold 120, as illustrated in FIG. 10, is placed on top of mold 100 as illustrated in FIG. 11. Mold 120 has an opening 122 that is essentially dimensioned to that of the desired final size of friction pad 18. Thereafter, and as illustrated in the final subassembly illustrated in FIGS. 2-4, friction pad material 19 may be poured or otherwise deposited into opening 122 such that it forms friction pad 18 on the first side of backing plate 16. The pouring of friction pad material 19 into opening 122 of mold 120 fills openings 52 and 53 sufficiently to encase the respectively positioned flanges 24, 25 in the openings in backing plate 16, as illustrated in FIGS. 3 and 4. In the preferred embodiment, friction pad material 19 extends up to top edge of shim 20 thereby remaining flush with the top surface of shim 20. This is clearly seen in FIGS. 3 and 4. In this way, the friction pad material does not interfere with anything that may be coming into contact with the top surface of the shim and also provides for a very desirable encasing of the flanges of the shim thereby providing a very improved construction to assist in resisting movement of the shim on or away from the backing plate.

As can thus be seen, the present invention is believed to be the first subassembly construction whereby the shim has a portion thereof (i.e. the aforementioned flanges) encased in the material that comprises the friction pad 18. This is certainly seen to be patentably distinct from the aforementioned cited art which at best merely describes a single molded structure that acts as both the shim and friction pad (see FIG. 2 of published application No. 2005/0082124) or a noise-damping pad element that is merely joined to (or otherwise abuts) the friction-generating pad element (see FIGS. 1 and 3 of published application No. 2005/0082124).

That is, it is believed that heretofore there has been no description or suggestion of a shim, which in the preferred embodiment is a multilayered structure such as that set forth above, having a portion thereof encased by the material that comprises the friction pad in a manner such as that disclosed herein.

While the invention has been particularly shown and described with respect to preferred embodiments thereof, it will be understood by those skilled in the art that changes in form and details may be made therein without departing from the scope and spirit of the invention.

It can now be seen that a subassembly constructed in accordance with the present invention improves and/or furthers the state of the art with respect to the mechanical coupling arrangements between a shim and a backing plate in a brake assembly, such as a disc-brake assembly. In particular, the present invention provides an improved methodology (and resulting assembly) of attaching a shim (which in the preferred embodiment is a multilayered shim) to a backing plate in a brake assembly that provides superior noise-reduction and a decrease in the likelihood of decoupling of the shim from the backing plate as well as a decrease in a likelihood of separation of the shim's multilayers themselves, which may result from, for example, the high heat caused during frictional engagement of the brake pads and the disc. Furthermore, the present invention provides for alternative embodiments so as to be useable with a variety of shim constructions, such as those mentioned above. Importantly, it can be seen that the present invention is widely applicable for a wide range of shim designs, as long as they have the construction (e.g. depending flanges alignable with holes in the backing plate) to permit the encasing as set forth above.

What is claimed is:

1. A method of forming a braking subassembly for use in a brake assembly, wherein the braking subassembly comprises a shim comprising at least one opening having one or more flanges perimetering therearound wherein the one or more flanges have an inner facing surface and an outer facing surface, a backing plate comprising a first side surface and a second side surface, with at least a first pass-through hole from the first side surface to the second side surface, and wherein the hole is perimetered by a wall, wherein the one or more flanges perimetering the at least one opening in the shim is alignable with and receivable in the at least first pass-though hole when the shim is coupled against the second side surface of the backing plate such that the inner facing surface of the one or more flanges is facing towards a center of the first pass-through hole and the outer facing surface is facing towards the wall of the first pass-through hole, and a friction pad formed of a friction pad material and coupled to the first side surface of the backing plate, wherein the method comprises the steps of:

placing the shim against the second side surface of the backing plate and aligning the opening in the shim with the at least first pass-though hole such that the one or more flanges extend into the at least first pass-though hole; and thereafter forming the friction pad on the first side surface of the backing plate and at least partially filling the at least one pass-though hole with said friction pad material such that at least a part of the inner facing surface and at least a part of the outer facing surface of the one or more flanges perimetering the at least one opening in the shim are encased in the friction pad material;

whereby the shim is resisted from movement at least in part by at least the part of the inner facing surface and at least the part of the outer facing surface of the flange being encased in the friction pad material.

* * * * *

UNITED STATES PATENT AND TRADEMARK OFFICE
CERTIFICATE OF CORRECTION

| | | |
|---|---|---|
| PATENT NO. | : 7,568,561 B2 | |
| APPLICATION NO. | : 11/407118 | |
| DATED | : August 4, 2009 | |
| INVENTOR(S) | : Robert Bosco, Jr. | |

It is certified that error appears in the above-identified patent and that said Letters Patent is hereby corrected as shown below:

Column 6

Lines 26-27, delete "pass-though" and replace it with --pass-through--

Line 37, delete "pass-though" and replace it with --pass-through--

Line 38, delete "pass-though" and replace it with --pass-through--

Line 42, delete "pass-though" and replace it with --pass-through--

Signed and Sealed this

Fifteenth Day of September, 2009

David J. Kappos
*Director of the United States Patent and Trademark Office*